No. 777,902. PATENTED DEC. 20, 1904.
J. E. JOHNSON.
SPEED REGULATOR.
APPLICATION FILED APR. 2, 1904.
NO MODEL. 13 SHEETS—SHEET 4.
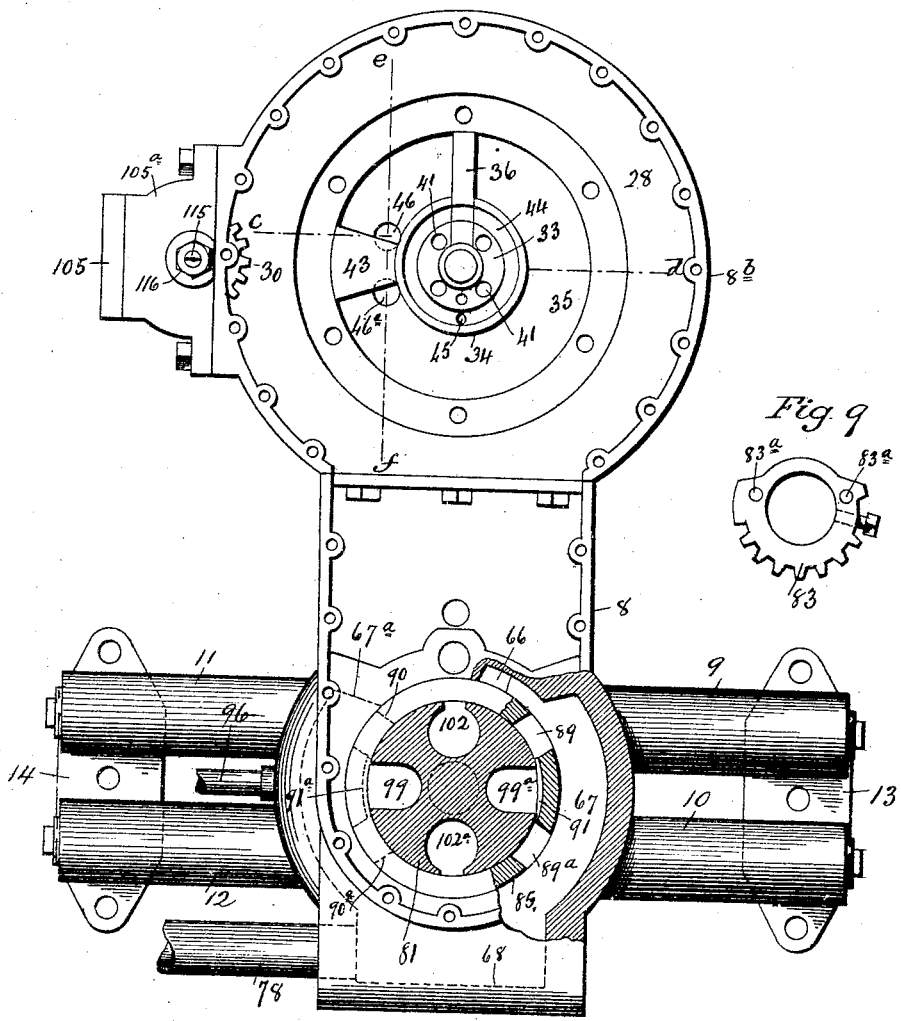
Fig. 5
Fig. 9
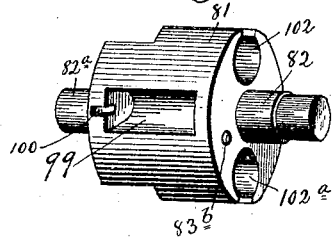
Fig. 6
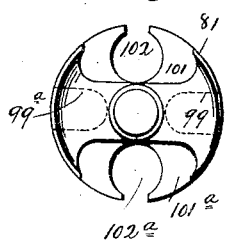
Fig. 7
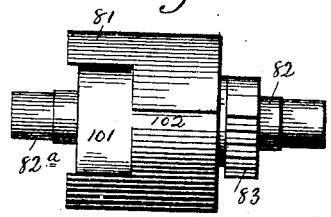
Fig. 8
Witnesses
J. H. Shumway
Clara L. Weed
Joseph E. Johnson
Inventor
By atty Seymour & Earle No. 777,902. PATENTED DEC. 20, 1904.
J. E. JOHNSON.
SPEED REGULATOR.
APPLICATION FILED APR. 2, 1904.
NO MODEL. 13 SHEETS—SHEET 5.
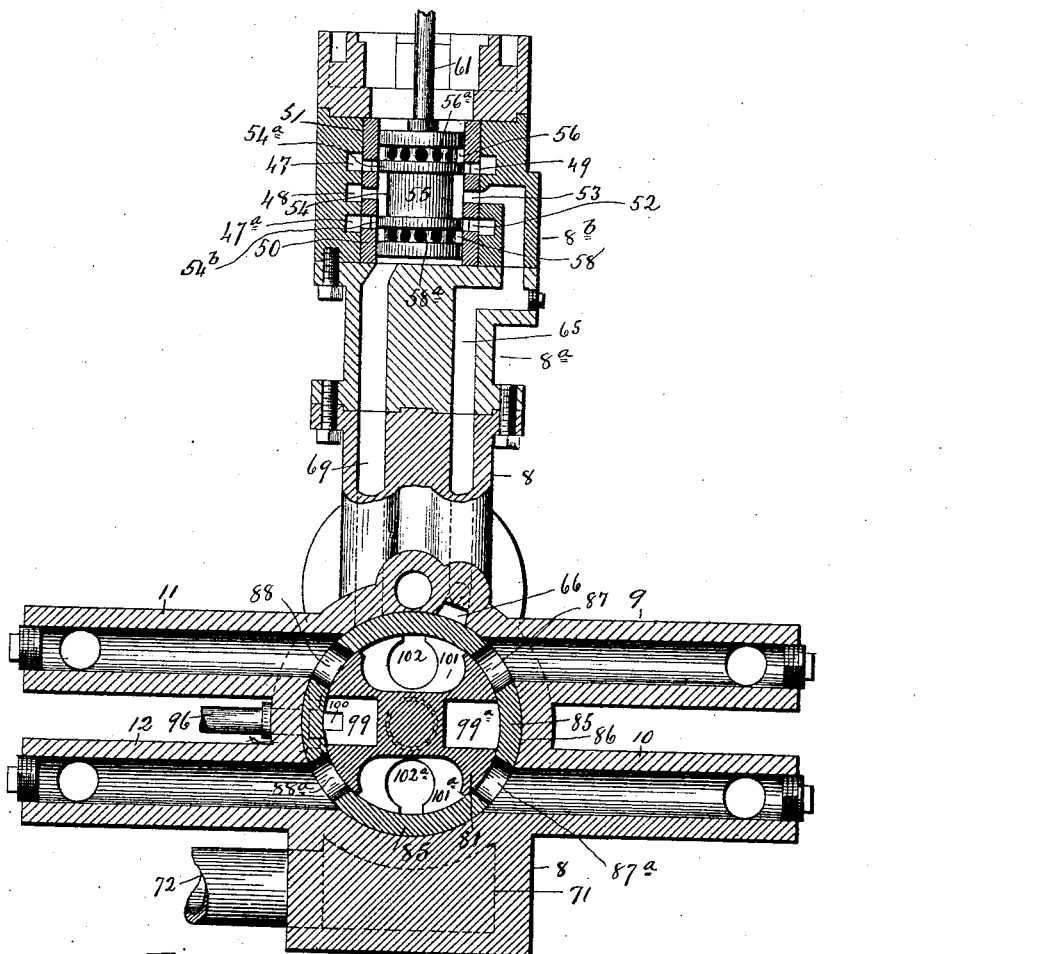
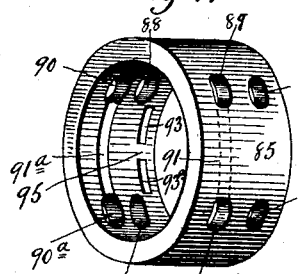
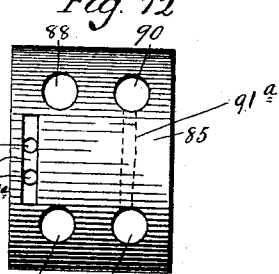

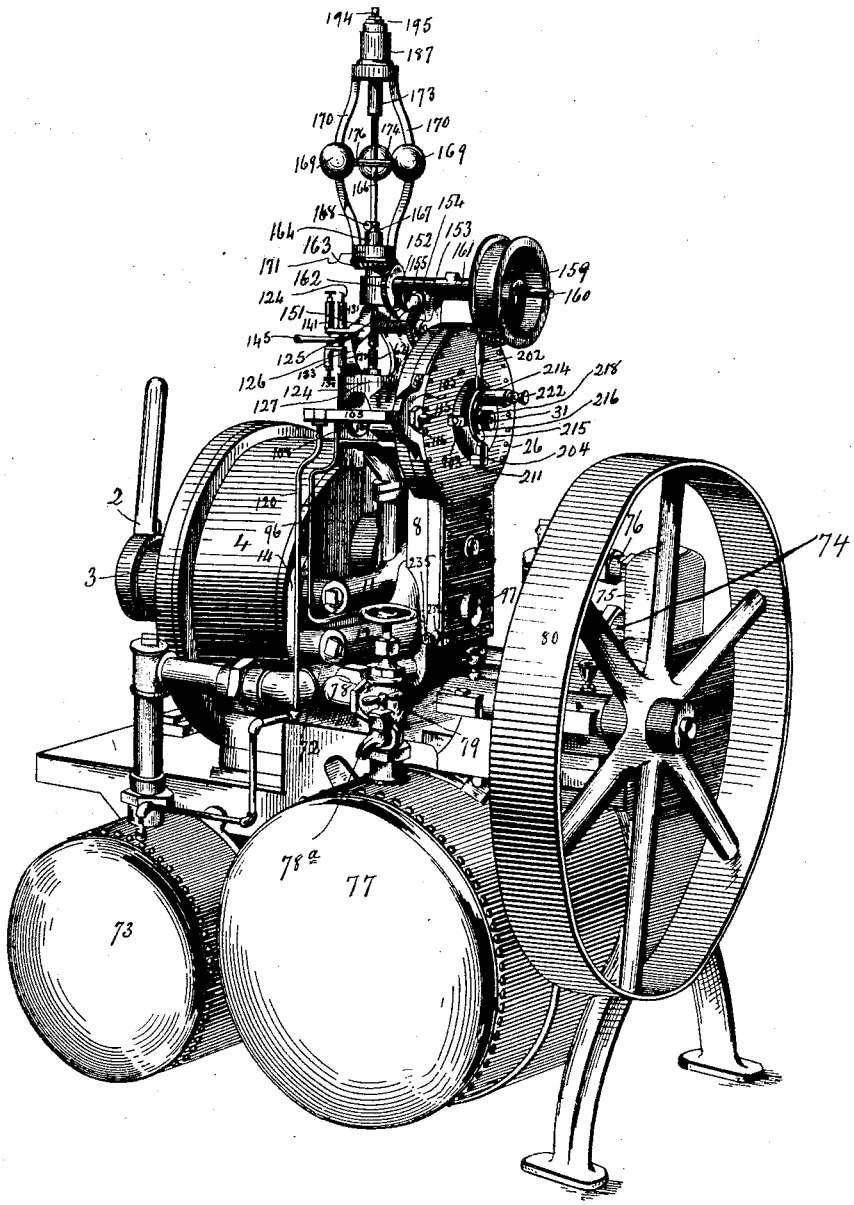

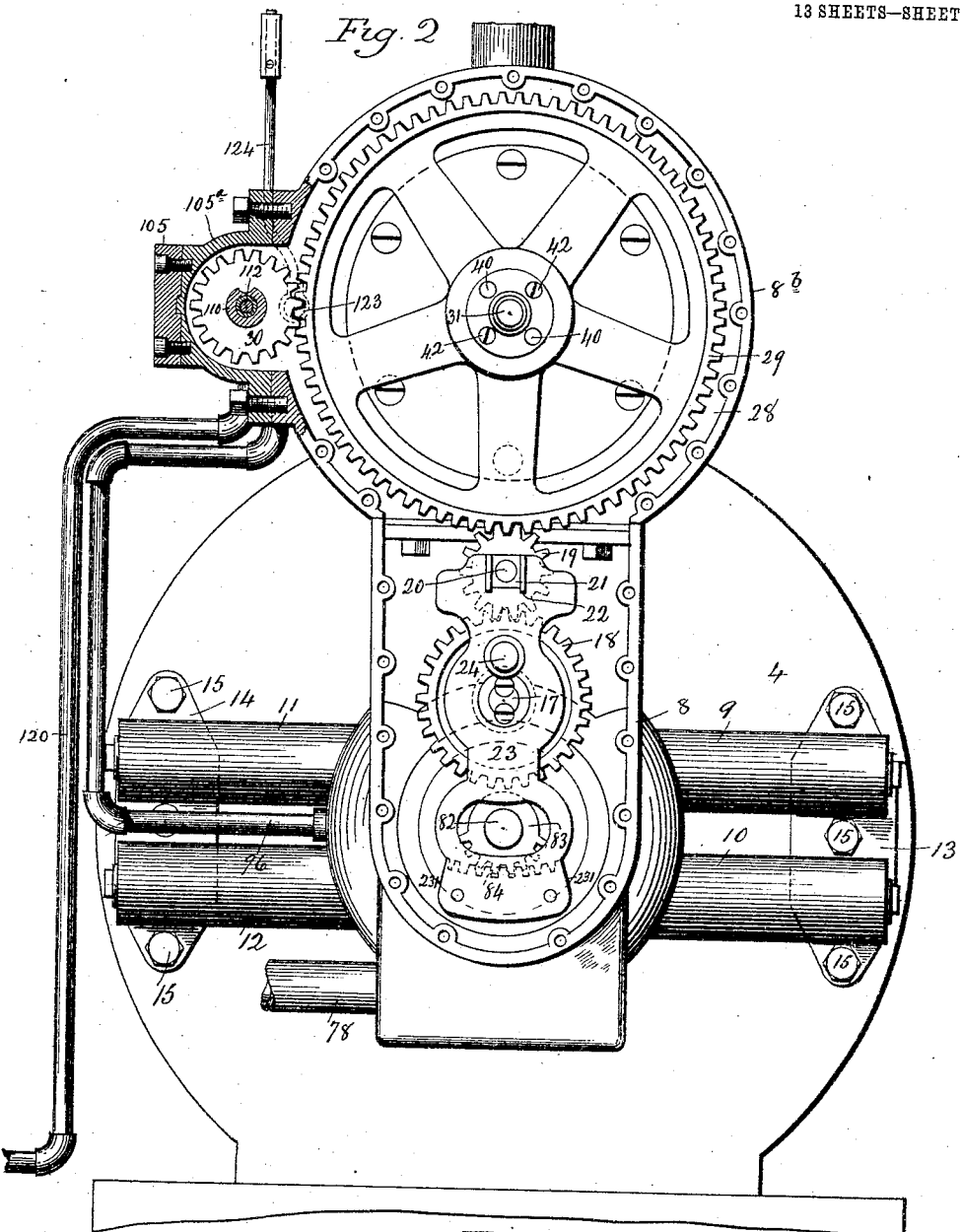

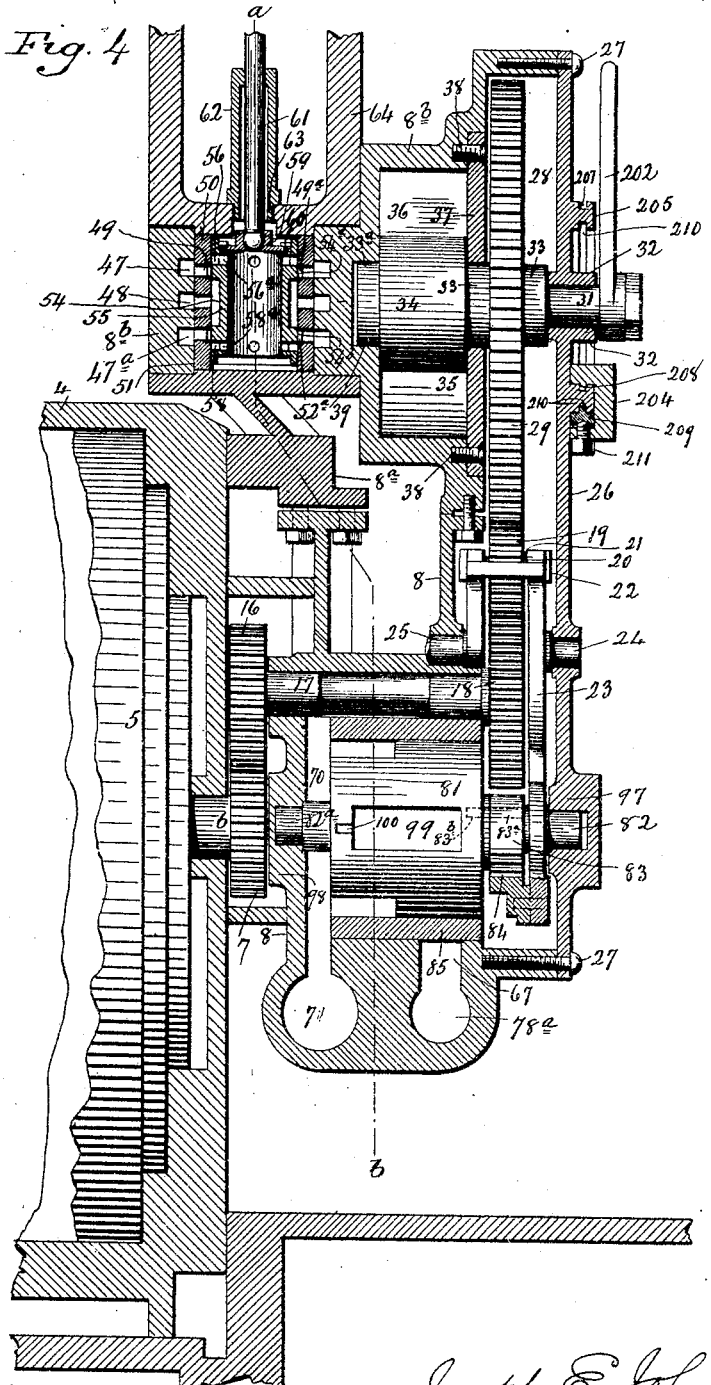

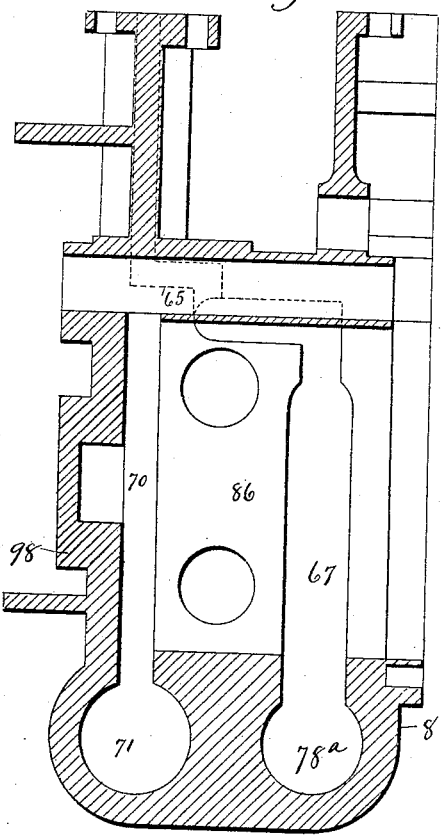
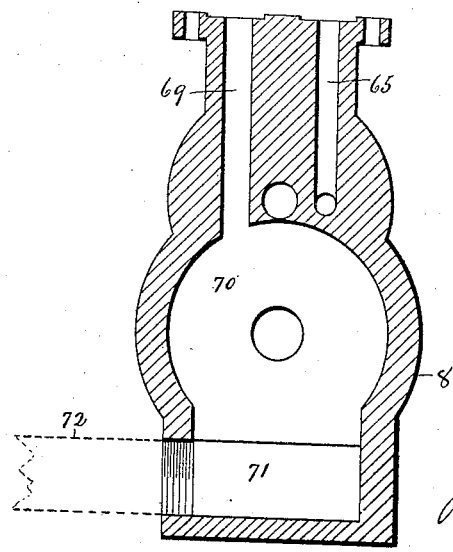

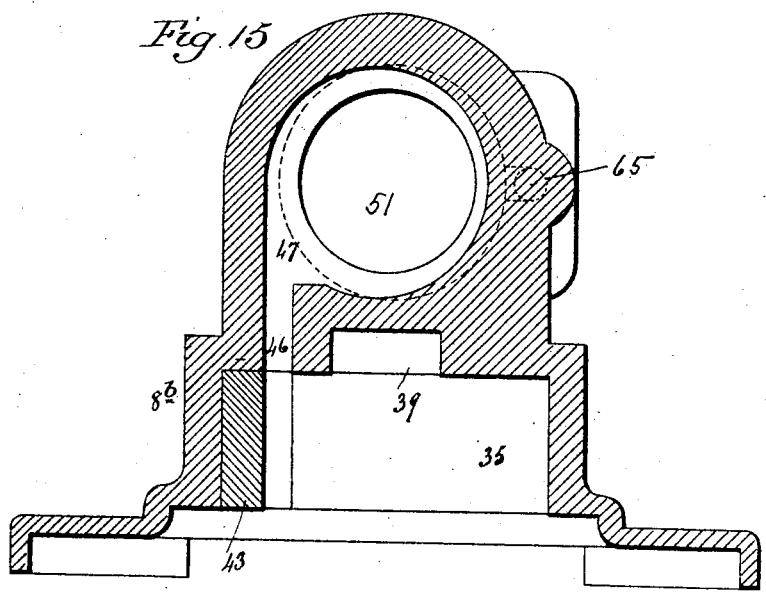
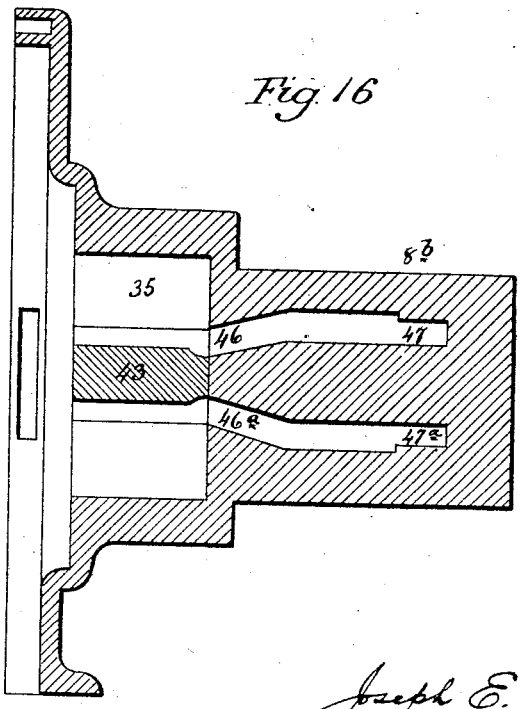

No. 777,902. PATENTED DEC. 20, 1904.
J. E. JOHNSON.
SPEED REGULATOR.
APPLICATION FILED APR. 2, 1904.
NO MODEL. 13 SHEETS—SHEET 8.

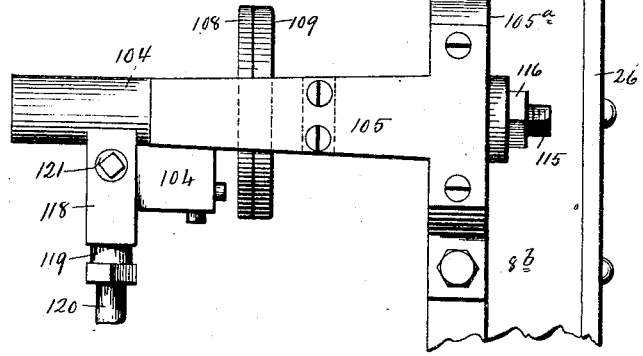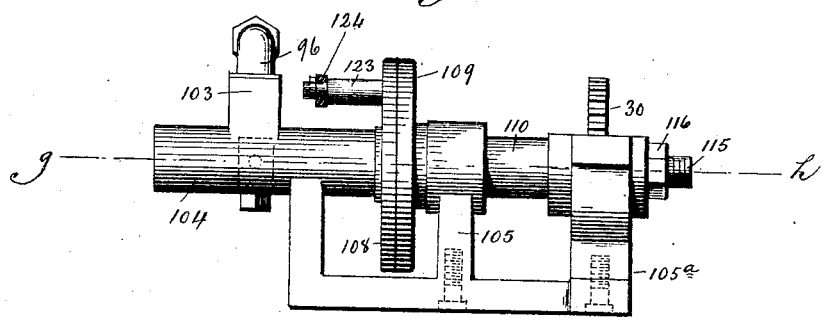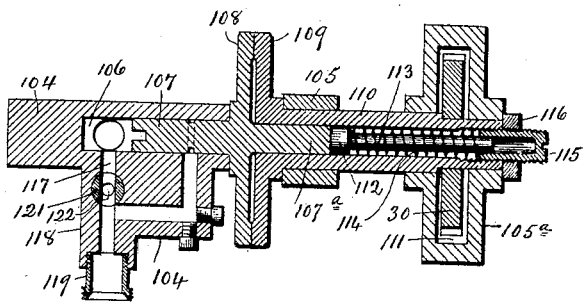

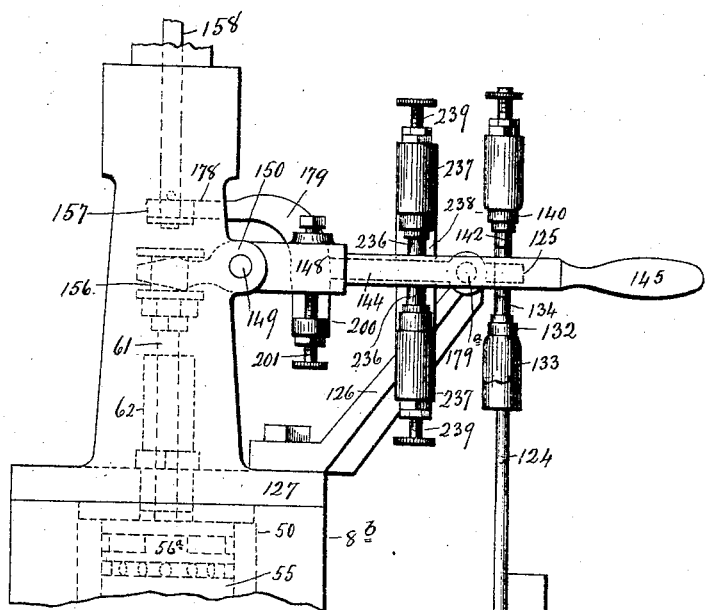
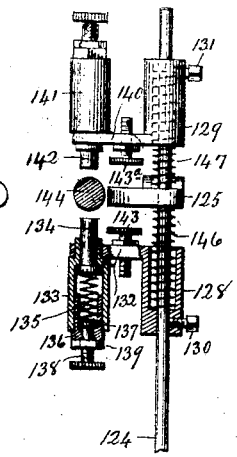
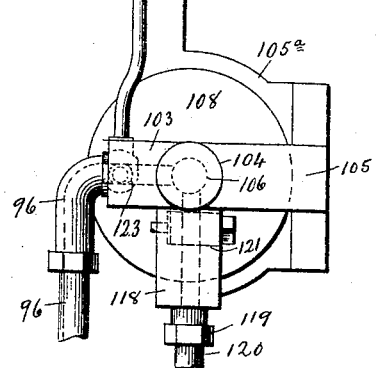

No. 777,902. PATENTED DEC. 20, 1904.
J. E. JOHNSON.
SPEED REGULATOR.
APPLICATION FILED APR. 2, 1904.
NO MODEL.
13 SHEETS—SHEET 11.
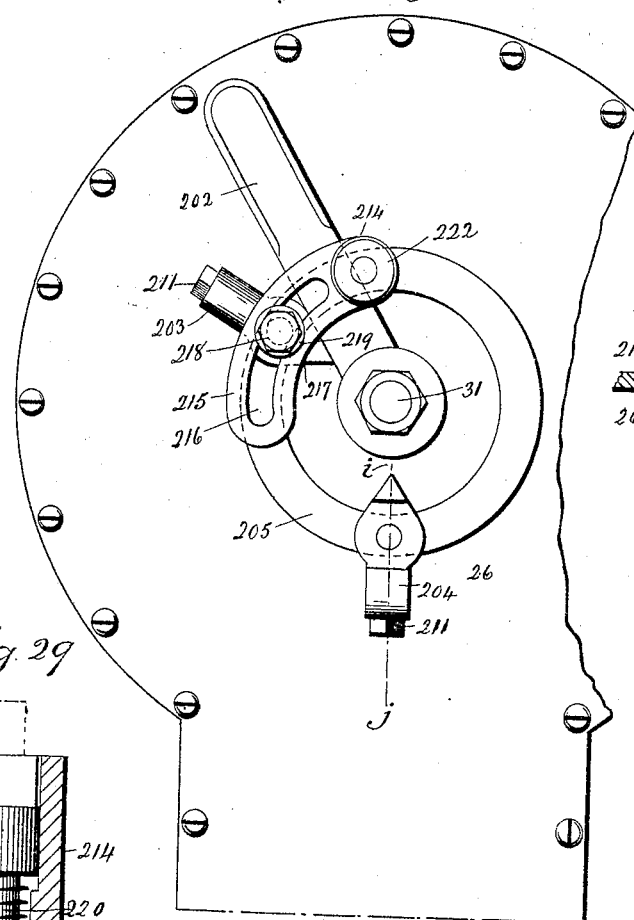
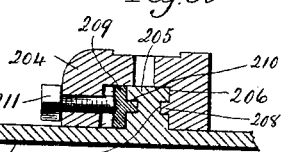
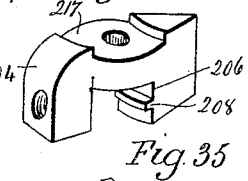
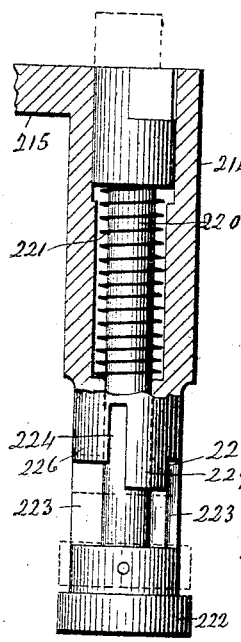
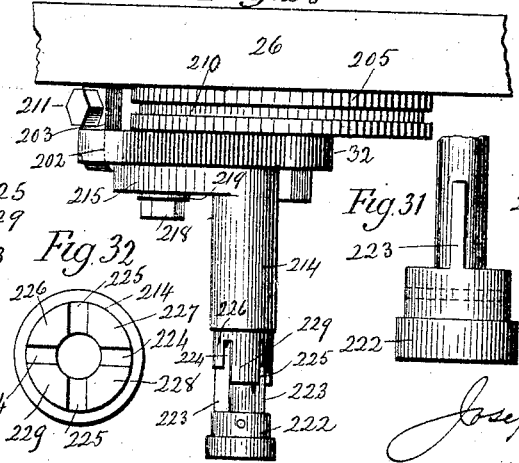
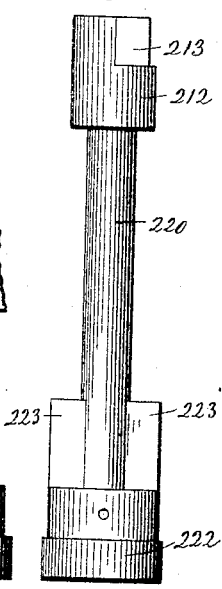

No. 777,902. PATENTED DEC. 20, 1904.
J. E. JOHNSON.
SPEED REGULATOR.
APPLICATION FILED APR. 2, 1904.
NO MODEL. 13 SHEETS—SHEET 12.
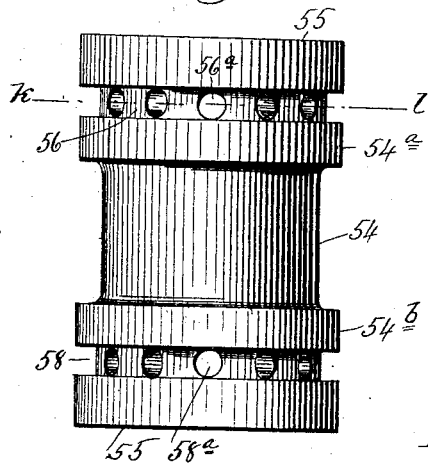
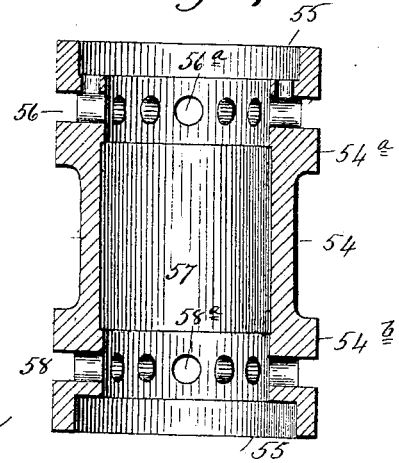
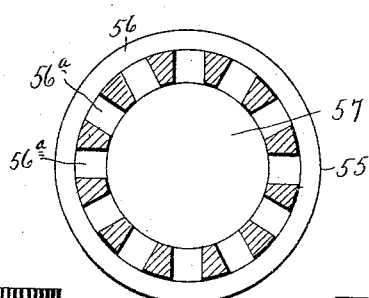
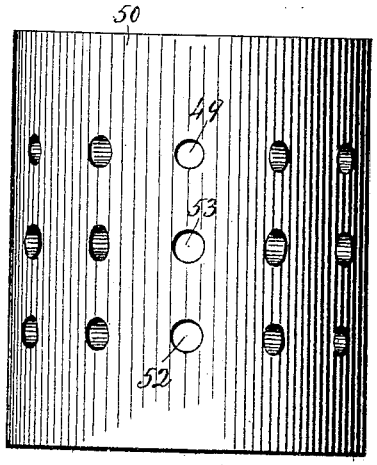
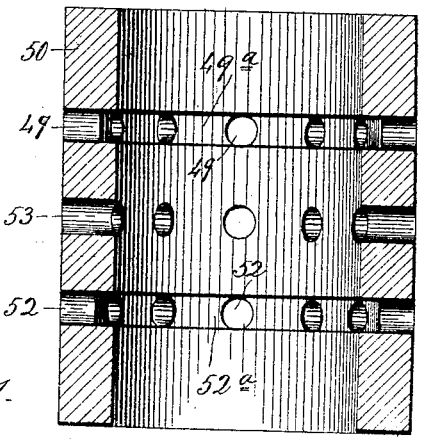
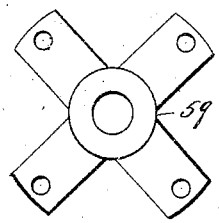

No. 777,902. PATENTED DEC. 20, 1904.
J. E. JOHNSON.
SPEED REGULATOR.
APPLICATION FILED APR. 2, 1904.
NO MODEL. 13 SHEETS—SHEET 13.
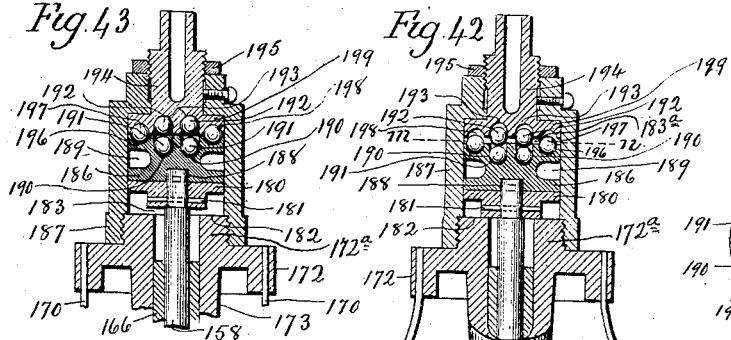
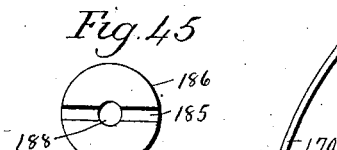
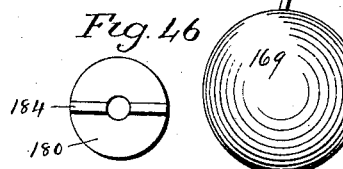
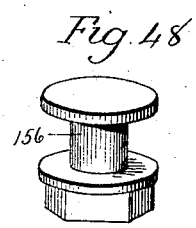
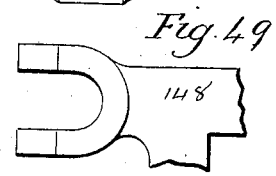
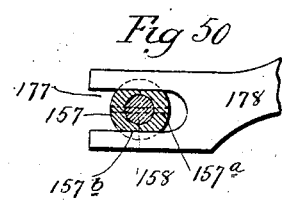
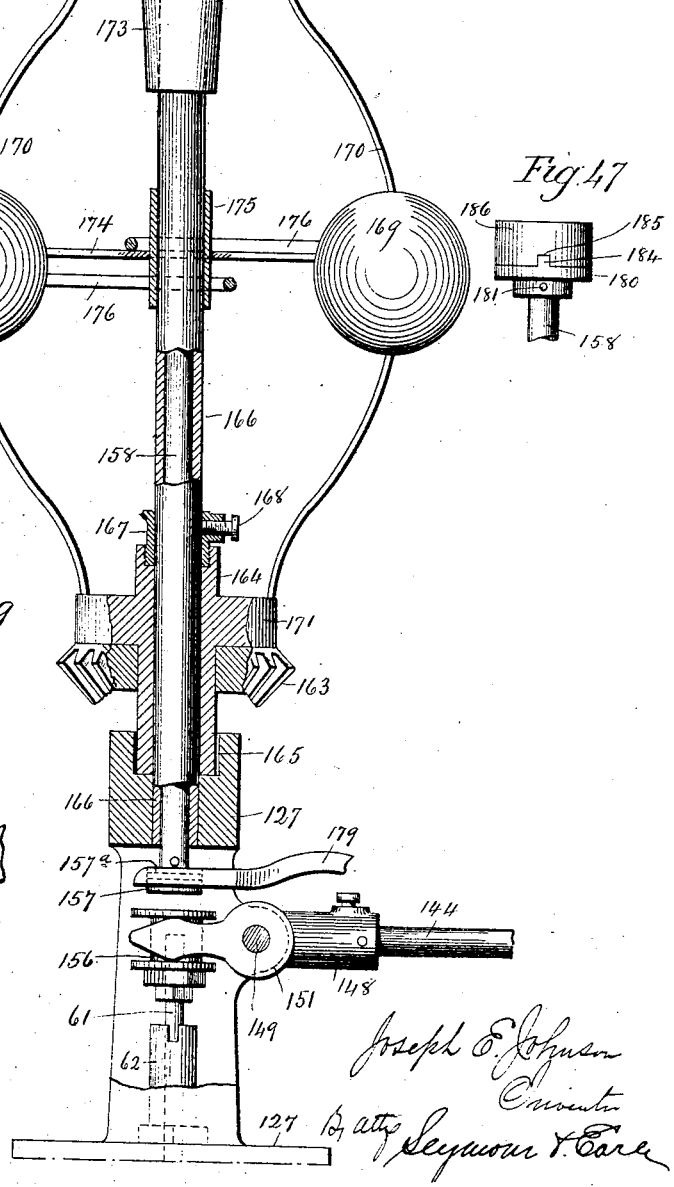

No. 777,902. Patented December 20, 1904.

UNITED STATES PATENT OFFICE.

JOSEPH E. JOHNSON, OF MERIDEN, CONNECTICUT, ASSIGNOR TO THE SCHENCK GOVERNOR CO., OF MERIDEN, CONNECTICUT, A CORPORATION.

SPEED-REGULATOR.

SPECIFICATION forming part of Letters Patent No. 777,902, dated December 20, 1904.

Application filed April 2, 1904. Serial No. 201,268.

*To all whom it may concern:*

Be it known that I, JOSEPH E. JOHNSON, of Meriden, in the county of New Haven and State of Connecticut, have invented a new and useful Improvement in Speed-Regulators; and I do hereby declare the following, when taken in connection with the accompanying drawings and the numerals of reference marked thereon, to be a full, clear, and exact description of the same, and which said drawings constitute part of this specification, and represent, in—

Figure 17:
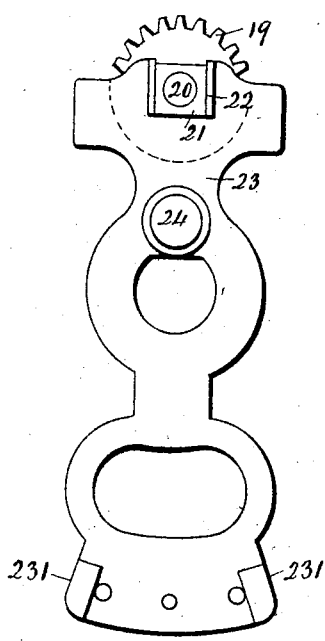
Figure 18:
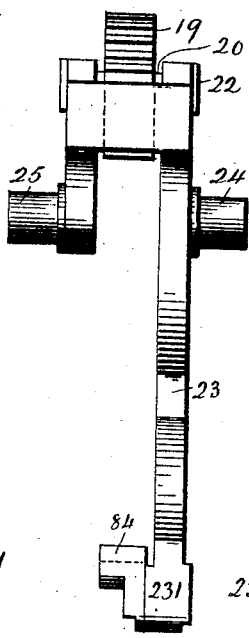
Figure 19:
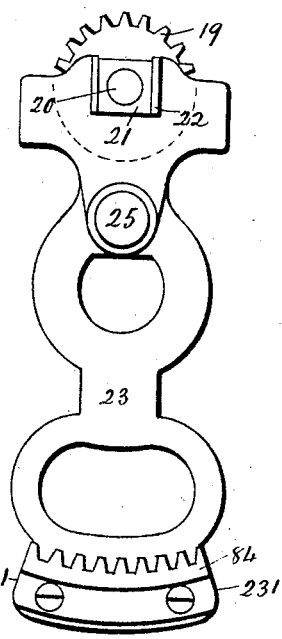
Figure 20:
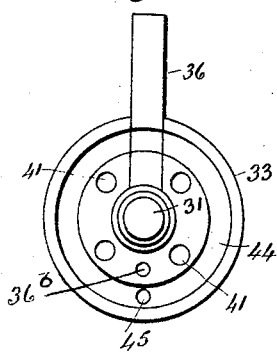
Figure 21:
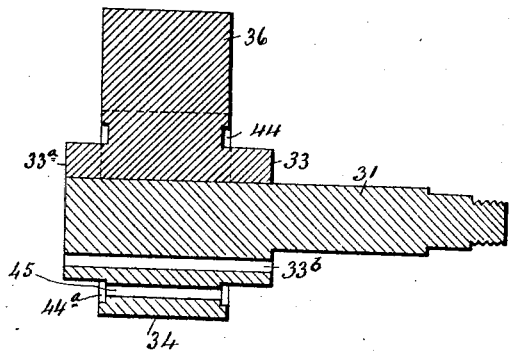

Figure 1, a perspective view of a speed-regulator embodying my invention; Fig. 2, a view, mainly in elevation, but partly in vertical section, of the main casing of the device with its cover removed; Fig. 3, a broken view, in inside elevation, of the lower end of the cover of the main casing to show the buffers mounted therein, one of them being represented in vertical section; Fig. 4, a broken view of the main casing in vertical central section, the parts within the casing being for the most part shown in elevation; Fig. 5, a view in front elevation of the main casing with the oscillating piston in elevation, the oscillating main valve in vertical section, and with the base-section of the casing broken to show one of the two segmental passages therein; Fig. 6, a detached perspective view of the main valve; Fig. 7, a view thereof in rear elevation; Fig. 8, a plan view thereof; Fig. 9, a detached view of the segmental gear mounted on the front trunnion of the main valve; Fig. 10, a view of the main casing in vertical section on the staggered line $a\,b$ of Fig. 4, showing the starting-valve and the main valve; Fig. 11, a detached perspective view of the sleeve-like casing of the main valve; Fig. 12, a view thereof in side elevation looking at its left-hand side; Fig. 13, a detached view, in vertical central section from side to side of the base-section, of the main casing, showing the arrangement of the inlet and exhaust passages therein; Fig. 14, a detached view, in vertical section from front to rear of the base-section, of the main casing on a reduced scale, showing the passages therein leading to and from the starting-valve; Fig. 15, a detached view in horizontal section through the upper section of the main casing on the line $c\,d$ of Fig. 5, the movable parts being taken out; Fig. 16, a view in vertical section through the upper section of the main casing on the line $e\,f$ of Fig. 5, the movable parts having been taken out; Fig. 17, a detached view, in front elevation, of the starting-lever; Fig. 18, a detached view thereof in side elevation; Fig. 19, a detached view thereof in rear elevation; Fig. 20, a detached view, in front elevation, of the oscillating piston and the hub thereof; Fig. 21, a view thereof in vertical longitudinal section; Fig. 22, a view in side elevation of the non-racing device, showing it as bolted to the upper section of the main casing, which is broken away; Fig. 23, a detached plan view of the non-racing device; Fig. 24, a detached view of the non-racing device in horizontal section on the line $g\,h$ of Fig. 23; Fig. 25, a broken view, in rear elevation, of my improved speed-regulator with particular reference to showing the speeder-lever and its connection with the starting device and the non-racing device; Fig. 26, a detached broken view, partly in side elevation and partly in vertical section, of the means employed to connect the non-racing device and the speeder-lever; Fig. 27, a detached broken view, in front elevation, of the upper portion of the cover of the main casing of the device; Fig. 28, a broken plan view of the said cover with particular reference to showing the stop-lever and the anti-cut-off stop coacting therewith; Fig. 29, an enlarged detached view of the anti-cut-off stop and the sleeve in which the same is mounted, the sleeve being shown in longitudinal section; Fig. 30, a detached plan view of the anti-cut-off stop; Fig. 31, a detached broken plan view of the outer end of the anti-cut-off stop looking edgewise upon one of its fins; Fig. 32, a view in elevation of the outer end of the sleeve for the anti-cut-off stop; Fig. 33, an enlarged broken sectional view on the line $i\,j$ of Fig. 27; Fig. 34, a perspective view of one of the adjustable stops; Fig. 35, a corresponding view of one of the stop-gibs; Fig. 36, an enlarged detached view in elevation of the starting valve; Fig. 37, a view thereof in vertical central section; Fig.

38, a view of the valve in horizontal section on the line k l of Fig. 36; Fig. 39, a detached view in elevation of the sleeve-like casing for the starting-valve; Fig. 40, a view thereof in vertical central section; Fig. 41, a detached plan view of the skeleton head employed to connect the starting-valve with the rod thereof; Fig. 42, a view, chiefly in vertical section, but partly in elevation, of the ball-governor; Fig. 43, a broken view through the upper portion of the ball-governor, showing its vibrating and antifriction balls in the positions which they have when the governor is in operation; Fig. 44, a view in transverse section on the line m n of Fig. 42; Fig. 45, a detached reverse plan view of the vibrating head of the ball-governor; Fig. 46, a detached plan view of the coupling-disk thereof; Fig. 47, a detached broken view, in side elevation, showing the vibrating head and coupling-disk as combined; Fig. 48, a perspective view of the coupling-head; Fig. 49, a broken plan view of the speeder-lever yoke; Fig. 50, a broken view, partly in plan and partly in horizontal section, showing the connection of the forked end of the safety-lever with the lower end of the vibrating starting-rod.

My invention relates to an improvement in that class of speed-regulators which employ a centrifugal governor to bring into play a regulating-motor operated by fluid under pressure and regulating the supply of motive power to the prime motor, the object of my present invention being to produce a simple, compact, reliable, convenient, and effective device constructed with particular reference to sensitiveness of operation and to durability in use.

With these ends in view my invention consists in a speed-regulator having certain details of construction and combination of parts, as will be hereinafter described, and pointed out in the claims.

I may here explain that my improved speed-regulator will be connected with the means supplying motive power to the prime motor according to the character thereof. Thus if the prime motor is a steam or gas engine my device will be connected with the valve system thereof. If the prime motor is a water-wheel, my device will be connected with the gate thereof. These connections may be made in a variety of ways, with which my present invention is not concerned.

As herein shown my improved speed-regulator is connected with the valve system or water-gate, as the case may be, of the prime motor by means of a clutch 2, located at the outer end of the shaft 3 of a regulating-motor organized with and forming an element of my improved device, but not necessary to be specifically shown or described herein, as this present invention does not relate to the details of its construction. Any regulating-motor suitable for the purpose may be employed—such, for instance, as that shown and described in Patent No. 748,659, dated January 5, 1904, granted to Marcus P. Schenck. As shown, the motor-case 4 contains a revolving head 5, having a short shaft 6, located in line with the said shaft 3 and carrying a pinion 7, housed within the rear portion of the base-section 8 of the upright main casing, which also comprises an intermediate section $8^a$ and an upper section $8^b$. The said base-section 8 is formed with four horizontally-arranged elbow-pipes 9, 10, 11, and 12, made integral with it. The elbows of the pipes 9 and 10 terminate in a plate 13, made integral with them, while the elbows of the pipes 11 and 12 terminate in a corresponding integral plate 14. These plates 13 and 14 receive bolts 15, by means of which the said base-section 8 is secured to the motor-case 4. The said pipes are the inlet and exhaust pipes for the regulating-motor, acting as inlet and exhaust pipes when the head 5 of the motor is revolving in one direction and as exhaust and inlet pipes when it is revolving in the opposite direction. The said pinion 7 meshes into a pinion 16, located directly above it and mounted on the rear end of a shaft 17, journaled in the base-section 8 and extending forward to the front of the said section, where it is furnished with a gear-wheel 18, meshed into by a pinion 19, the trunnions 20 of which enter boxes 21, located in slots 22, formed in the yoke-shaped upper end of a vertically-arranged oscillating starting-lever 23, provided above its center with trunnions 24 and 25. The said trunnion 24 has bearing in the main casing-cover 26, which is secured by bolts 27 to the sections 8 and $8^b$ of the main casing, while the trunnion 25 has bearing in the said base-section 8. The said main casing is formed with a large vertical gear-chamber 28, closed in by the said cover 26.

The pinion 19 meshes into a main gear-wheel 29, occupying the enlarged upper portion of the chamber 28 and constituting, as it were, a multiplying gear-wheel. This gear-wheel 29 meshes into a small gear-wheel 30, constituting a feature of a non-racing mechanism bolted to the left-hand side of the upper casing-section $8^b$ and to be described later on.

The main wheel 29 is mounted upon a horizontal shaft 31, the outer end of which has bearing in a hub 32 in the cover 26 and the inner end of which merges into the outer trunnion 33 of an oscillating hub 34, located in an annular pressure-chamber 35, formed in the upper casing-section $8^b$. The said hub carries a radially-arranged arm 36, forming a piston which oscillates back and forth in the said chamber 35, which constitutes, in effect, a piston chamber or cylinder. The said trunnion 33 is itself journaled in a disk-shaped plate 37, closing in the chamber 35, secured in place by screws 38 and corresponding, in effect, to a removable cylinder-head. At its rear end the hub 34 is formed with a trunnion 33ª, having bearing in a recess or step 39, leading out of the rear wall of the chamber 35. The main wheel 29 is rigidly connected with the piston 36 by means of two dowel-pins 40, carried by the wheel and entering holes 41 in the trunnion 33, and by two screws 42, passing through the hub of the wheel into the said trunnion. The said chamber 35 is virtually divided into two chambers by the oscillating piston 36 and by a fixed block 43, extending radially inward from the outer wall of the chamber and having its inner end concaved to conform to the curvature of the hub 34, which rotates in contact with it. The hub 34 is balanced by the provision of its ends with concentric annular channels 44 and 44ª, connected by a transverse oil-passage 45, whereby the pressure of the oil upon the ends of the hub is equalized, so that it is left free to be oscillated. The ends of the trunnions 33 and 33ª of the said hub are connected by an oil-passage 33ᵇ, which permits the escape outward of any oil that may work into the bottom of the recess or step 39 and tends to thrust the hub 34 forward.

The oil under pressure enters and leaves the pressure-chamber 35 through passages 46 and 46ª, intersecting its rear wall at points above and below and close to the block 43 and leading rearwardly therefrom, the oil entering the chamber through the passage 46 and exhausting through the passage 46ª when the oscillating piston 36 is moving from left to right and entering the chamber through the passage 46ª and exhausting through the passage 46 when the piston is moving from right to left.

The passage 46, which, as above described, is both an inlet and an exhaust passage alternately, leads at its rear end into an annular channel 47, formed in the upper casing-section 8ᵇ, while the passage 46ª, which is also an inlet and an exhaust passage alternately, leads at its rear end into a corresponding annular channel 47ª, formed in the said casing-section 8ᵇ. The channel 47 is located directly above the channel 47ª and separated therefrom by an annular intermediate supply-channel 48, also formed in the said casing-section 8ᵇ.

The channel 47 registers with a circular series of horizontal holes 49, formed in the upper portion of a vertically-arranged sleeve-like valve-casing 50, set into a circular chamber 51, formed in the casing-section 8ᵇ and located directly back of the pressure-chamber 35. At their inner ends the said holes 49 terminate in an annular channel 49ª, formed in the inner face of the valve-casing and connecting all of the said holes. Correspondingly the said channel 47ª is registered with a circular series of horizontal holes 52, formed in the lower portion of the valve-casing 50 and at their inner ends intersecting an annular channel 52ª, formed in the inner face of the sleeve and connecting all of them. The said annular supply-channel 48 registers with a circular series of horizontal holes 53, formed in the middle of the valve-casing, located between the series of holes 49 and 52 and opening at their inner ends directly into a wide annular supply-chamber 54, occupying the central portion of a starting-valve 55, which fits within the casing 50 and moves up and down therein. The said starting-valve 55 is formed at its upper end with an external annular groove 56, from which a circular series of holes 56ª lead into the upper end of its central exhaust-passage 57, the said channel 56 and holes 56ª coacting with the holes 49 and channel 49ª of the casing 50 when the valve is moved downward. At its lower end the valve is formed with an external annular channel 58, from which an annular series of holes 58ª lead into the lower end of the said central exhaust-passage 57, the said passage 58 and holes 58ª coacting when the valve is moved upward with the holes 52 and channel 52ª of the said valve-casing. The supply-chamber 54 of the starting-valve 55 is flanked at its upper and lower ends by cut-off shoulders 54ª and 54ᵇ. Normally the shoulder 54ª closes the annular channel 49ª in the valve-casing 50 and the shoulder 54ᵇ closes the annular channel 52ª therein. When the valve is moved downward, however, the shoulder 54ª opens the channel 49ª for the exhaust of oil from the passage 47 into the central passage 57 of the valve, while at the same time the shoulder 54ᵇ opens the channel 52ª for the inlet of oil through the holes 52 from the wide annular supply-chamber 54 of the valve into the passage 47ª, which leads to the chamber 35. On the other hand, when the valve 55 is lifted the operation just above described is reversed. The valve is open at its upper and lower ends to balance or equalize the pressure of oil upon it and provided at its upper end with a skeleton head 59, secured to it by screws 60 and receiving the lower end of the valve-rod 61, which has a ball-and-socket connection with it, so as to prevent the valve from being thrust sidewise against the walls of its casing. This rod has bearing, Fig. 4, in the closed upper end of a long sleeve 62, the lower end of which is formed with a threaded neck 63, screwed into the lower end of a centrifugal or ball governor frame 64, which is made independent of the main casing and secured to the section 8ᵇ thereof. The said starting-valve 55 is operated by a centrifugal governor and controls the admission of oil to the pressure-chamber 35 for the oscillation of the piston 36 therein.

Oil is supplied to the annular supply-chamber 48 of the valve-casing 50 by a passage 65, Figs. 10 and 13, formed in the sections 8ᵇ, 8ª, and 8 of the main casing. This passage 65 leads downward and in the base-section 8 intersects the rear end of a horizontal passage 66, the forward end of which intersects the upper end of the right-hand segmental passage 67, Fig. 5, formed in the said section 8 and rising from the inlet-chamber 68, therein. A segmental passage 67$^a$, formed at the left end of the base-section 8, corresponds to the passage 67, already mentioned. The oil rising through the passage 65 is utilized to operate the oscillating piston 36, after which it is exhausted through a passage 69, formed partly in the section 8$^a$ and partly in the section 8 and leading downward into an exhaust-space 70, which at its lower end has connection with the exhaust-chamber 71 in the bottom of the section 8.

From the exhaust-chamber 71 the oil passes through an exhaust-pipe 72 to the exhaust-tank 73, Fig. 1, from which it is drawn through a pipe 74 (only partially shown) into the pump 75, by means of which it is forced through a pipe 76 (also partially shown) into the pressure-tank 77, from which it is conducted through an inlet-pipe 78, containing the valve 79, into the inlet-chamber 68. The pump, of any approved construction, is driven by a pulley 80, run by a belt from any convenient source of power. The inlet-pipe 78 enters the tank 77 and extends downward therein near to the bottom thereof and is furnished with a bib-valve 78$^a$, through which the oil is drawn off when necessary to renew it or for any other purpose.

The oil in the tank 73 and in the several passages, &c., of the device is normally at rest, though maintained under pressure by the action of the pump. Instead of using oil as the motive fluid for the speed-regulator water or some mixture may, if desired, be used, though oil has the preference. Any operation, either up or down, of the starting-valve 55 by the centrifugal governor releases the oil and permits it to circulate under its pressure for the operation in one direction or the other of the oscillating piston 36, which turns the main wheel 29, which acts through the pinion 19 to swing the oscillating starting-lever 23 in one direction or the other, according as the prime motor has run above or fallen below the normal speed. At the time the lever 23 is swung one way or the other the gear-wheel 18, connected with the regulating-motor, is at rest, and thus forms a point of purchase from which to swing the lever 23, the pinion 19 traveling in the manner of a railway-gear over the wheel 18 in either direction. This swinging movement of the lever 23 is utilized for oscillating in one direction or the other the main valve 81, the forwardly-projecting trunnion 82 of which is provided with a segmental gear 83, meshed into by a segmental rack 84, extending inward from the lower end of the lever, which as it is swung one way or the other operates through its said rack to turn the said main valve. The segmental gear 83 is coupled to the valve 81 by means of two dowel-pins 83$^a$ entering holes 63$^b$, formed in the outer end of the valve, which extends from front to rear. The said main valve 81 is contained in a sleeve-like valve-casing 85, set into a horizontal chamber 86, formed in the base-section 8 and located between the two segmental oil-passages 67 and 67$^a$. This valve-casing is formed near its inner end with a right-hand pair of ports 87 and 87$^a$ and with a corresponding left-hand pair of ports 88 and 88$^a$. The ports 87 and 87$^a$ register with the pipes 9 and 10, while the ports 88 and 88$^a$ register with the pipes 11 and 12. These ports and pipes provide for the inlet of oil to and the exhaust of oil from the regulating-motor, according to the direction in which the main valve 81 is turned. The said valve-casing 85 is formed near its outer end with a right-hand pair of supply-ports 89 and 89$^a$ and with a corresponding left-hand pair of supply-ports 90 and 90$^a$, respectively, located directly in front of and in line with the right-hand pair of ports 87 and 87$^a$ and the left-hand pair of ports 88 and 88$^a$. Oil is supplied to these supply-ports directly from the segmental oil-passages 67 and 67$^a$, which at their lower ends open into the oil-supply chamber 68, which receives oil from the inlet-pipe 78. The ports 89 and 89$^a$ are connected on the inside of the valve-casing 85 by means of a shallow channel 91, while the ports 90 and 90$^a$ are connected by a corresponding channel 91$^a$. These channels assist in providing for balancing or equalizing the pressure on the main valve 81. The said valve-casing 85 is also formed at its extreme inner end and on its left-hand side with two inlet-ports 92 and 92$^a$, leading out of the bottom of grooves 93 and 93$^a$, located in line with each other and formed in its inner face. The said ports 92 and 92$^a$ open into a channel 94, formed upon the outside of the sleeve and uniting them. The space between the inner ends of the grooves 93 and 93$^a$ constitutes a cut-off 95, preventing any oil from entering either of the said grooves when the valve 81 is at rest. From the channel 94 the oil passes into a pipe 96, which conducts it upward to the non-racing device to be described later on.

With reference now to the main valve 81, its outer journal 82, Fig. 6, bears in a boss 97, Fig. 4, formed in the cover 26, near the lower end thereof, while its inner trunnion 82$^a$ bears in a step 98, Fig. 4, formed in the base-section 8 and leading out of the center of the rear wall of the exhaust-space 70. The said valve 81 is formed with a long and deep right-hand inlet-port 99, Fig. 7, and a corresponding left-hand port 99$^a$, these ports being located directly opposite each other, leading from front to rear and extending inward well toward the center of the valve. Normally the ports 99 and 99$^a$ are filled with oil, so as to balance the valve by equalizing the pressure on it by the registration of their outer ends with the shallow channels 91 and 91$^a$, formed in the inner face of the outer end of the valve-casing 85, so as to connect the supply-ports 89 and 89ª and 90 and 90ª therein. At the same time, and therefore under normal conditions, the inner ends of the ports 99 and 99ª are closed by those portions of the inner face of the valve-casing 85 lying between the ports 87 and 87ª and 88 and 88ª. Under these conditions there will be no circulation of oil. The port 99ª is formed at its inner end with a slot 100, Fig. 6, which feeds oil to the ports 92 and 92ª, through which oil is supplied to the non-racing device. When, however, the main valve 81 is in its normal position, the slot 100 is closed by the bridge 95, Fig. 11, which cuts off the supply of oil to the non-racing mechanism. The main valve 81 is also formed with two large, deep, transversely-arranged exhaust-ports 101 and 101ª, Figs. 7 and 8, located one above the other in a vertical plane at a right angle to the horizontal plane which passes through the ports 99 and 99ª. When the main valve is turned from left to right, the oil is exhausted from the regulating-motor into the exhaust-space 70 through the pipe 9, the port 87, the exhaust-port 101 in the main valve, the pipe 12, the port 88ª, and the exhaust-port 101ª in the main valve. On the other hand, when the said main valve is turned from right to left the oil is exhausted from the regulating-motor into the exhaust-space 70 through the pipe 11, the port 88, the exhaust-port 101 in the valve, the pipe 10, the port 87ª, and the exhaust-port 101ª in the valve. As will be understood by reference to Figs. 6 and 8, inclusive, of the drawings, the ports 101 and 101ª open at their inner ends directly into the exhaust-space 70. For the purpose of balancing or equalizing the pressure upon the said main valve it is formed with two circular pressure-chambers 102 and 102ª, Fig. 6, leading forward from its exhaust-ports 101 and 101ª and opening through its forward face as well as through its periphery. These chambers are of course only filled with oil when the regulating-motor is being exhausted of its oil. This main valve 81, as it will now be understood, is oscillated in one direction or the other by the action of the oscillating piston 36 and has for its function the admission of oil under pressure to the regulating-motor, which in turn controls the supply of motive power to the prime motor.

The said main valve also provides for exhausting the oil from the regulating-motor.

In order to prevent an excessive movement in either direction of the steam-valves or water-gate of the prime motor, I provide a so-called "non-racing" device, which prevents what is technically known as the "racing" or the "hunting" of the prime motor.

When the main valve 81 is oscillated in either direction to admit oil to the regulating-motor, it also admits oil to the non-racing supply-pipe 96, Figs. 10 and 23, by which the oil is led upward to the arm 103 of the chambered oil-pressure section 104 of the sectional non-racing-device frame, which also comprises a bearing-section 105 and a bracket-section 105ª, which latter is bolted to the left-hand side of the upper section 8ᵇ of the main casing. The said arm 103 leads into a pressure-chamber 106, Fig. 24, formed in the said section 104. This chamber 106 receives the long plunger-like trunnion 107 of an oscillating friction-disk 108, which coacts with a corresponding but rotary disk 109, having a long hollow spindle 110, journaled in the said section 105 and upon its forward end carrying a gear-wheel 30, meshing into the main wheel 29 and housed in a chamber 11 in the said section 105ª. The disk 108 is rotated only during the action of the starting-piston 36.

The trunnion 107ª of the disk 108 projects forward through the center of the disk 109 into the hollow spindle 110 thereof and is engaged by the head 112 of a plunger 113, located in the said shaft and encircled by a spring 114, the said plunger and spring being inserted in place through the open forward end of the shaft, which is internally threaded for the reception of a hollow adjusting-screw 115, receiving the extreme outer end of the plunger and adjusted for changing the tension of the spring 114. A jam-nut 116 on the screw 115 and bearing against the extreme forward end of the shaft 110 is provided for securing the screw 115 in any position of adjustment. The oil is exhausted downward from the said pressure-chamber 106 through a passage 117, Fig. 24, formed in a depending arm 118 of the said section 104. This arm is connected by a union 119 with an exhaust-pipe, Fig. 22, 120, discharging into the exhaust-tank 73. In the arm 118 I mount a key 121, Fig. 24, extending into the passage 117 and formed with a hole 122, which as the key is turned constricts or expands the passage 117, and so times the exhaust of the oil from the chamber 106, and this in turn times the action of the friction-disk 108, which by the spring 114 is pushed away from the rotary disk 109 as soon as the oil is exhausted from the chamber 106.

The oscillating friction-disk 108 is provided with an eccentric-stud or crank-pin 123 for the attachment to it of the lower end of the upwardly-extending non-racing rod 124, Figs. 25 and 26. This rod passes upward through and plays up and down in a lug 125, formed upon the upper end of a bracket-like arm 126, secured to the base of the centrifugal governor-frame 127, which is bolted to the intermediate section 8ª of the main casing. Upon the said rod at points respectively above and below the lug 125 I locate an upper and a lower buffer-head. As these two heads correspond to each other, a description of one will answer for both. Thus the lower buffer-head comprises a sleeve 128, Fig. 26, through which the rod 124 passes upwardly and thence through the lug 125 and thence through the corresponding sleeve 129 of the upper buffer-head, the lower buffer-head being adjustably secured to the rod by means of a set-screw 130 in the sleeve 128 and the upper buffer-head being adjustably secured to the rod by means of a set-screw 131 in the sleeve 129. The lower buffer-head also comprises a cross-bar 132, connecting the upper end of the sleeve 128 with the upper end of a depending sleeve 133, from the upper end of which projects a yielding buffer-pin 134, controlled by a spring 135, located within the sleeve 133, confined therein by a screw-plug 136 and adjusted in tension by a disk 137, moved by a screw 138, passing through the plug 136 and set by a jam-nut 139. The upper buffer-head has a corresponding cross-bar 140, carrying a corresponding sleeve 141, furnished with a correspondingly constructed, arranged, and controlled buffer-pin 142. Screw-buttons 143 143ª, mounted in the said cross-bars 132 and 140, engage with the upper and lower faces of the lug 125 to limit the extreme motion of the rod 124 up and down. The said buffer-pins 134 and 142 are respectively located above and below and close to the upper and lower faces of a speeder-lever 144, having a handle 145, and are normally maintained at predetermined distances above and below the said lever by means of equalizing-springs 146 and 147. The lower spring 146 is located in the said sleeve 128 and at its upper end impinges against the lower face of the said lug 125, while the upper spring 147 is located in the upper sleeve 129 and impinges at its lower end against the upper face of the lug. Any movement of the rod 124 up or down is against the tension of these springs 146 and 147, which also operate to restore the buffer-heads to their normal positions, in which the pins 134 and 142 are equally distant from the speeder-lever.

When the rod 124 is drawn downward by the action of the oscillating friction-disk 108, the spring 147 is compressed and the buffer-pin 142 brought into engagement with the speeder-lever, which it tends to push downward into its normal position, and therefore to resist the tendency of the centrifugal governor to open the starting-valve 55 too much, and so cause a greater movement of the steam-valves or the water-gate of the prime motor than required to restore the speed thereof to the normal rate. On the other hand, when the friction-disk 108 lifts the rod 124 the spring 146 is compressed and the buffer-pin 134 engaged with the lower face of the speeder-lever 144, with a tendency to lift the same into its normal position, and so counteract the tendency on the part of the centrifugal governor to lift the starting-valve 55 more than is required to correct the speed of the prime motor. It will thus be seen that at the same time the centrifugal governor operates the starting-valve 55 to start up the regulating-motor it also brings into operation the non-racing device, which prevents the starting-valve from moving too far, and so overdoing the work of correction.

The speeder-lever 144 is mounted in a fork 148, Figs. 1, 25, 42, and 49, turning on a rod 149, supported at its left-hand end in a lug 150, formed on the frame 127, and at its right-hand end in an arm 151, forming a part of the said frame. This rod 149 is encircled by a torsion-spring 152, connected at one end with said fork 148 and at its opposite end with a worm-gear 153, turning upon the right-hand end of the said rod 149 and operated by a worm-pinion 154, mounted in the frame 127 and furnished with a finger-button 155. The fork 148 receives a coupling-head 156, Fig. 48, secured to the upper end of the valve-rod 61, whereby the speeder-lever is connected with the starting-valve 55. The torsion-spring 152 is arranged so that it exerts a constant effort to depress the speeder-lever and lift the valve 55, this tendency being resisted by the downward push upon the upper end of the coupling-head 156 of a button 157, located upon the lower end of the vertically-movable vibrating rod 158 of the ball-governor.

The ball-governor is constantly driven from the prime motor by a belt (not shown) running over a pulley 159 on a shaft 160, running in a bearing 161 and having its inner end furnished with a miter-gear 162, meshing into a miter-gear 163, having a hub 164, Fig. 42, the lower end of which enters a recess 165 in the frame 127, the lower end of the hub 164 turning on the bottom of the recess. A fixed hollow shaft 166, having its lower end mounted in the upper end of the frame 127 concentric with the said recess 165 therein, rises through the hub 164, which turns upon it as upon a vertical axle. A collar 167, adjustably secured to the shaft 166 by a set-screw 168, engages with the upper end of the hub 164 and prevents the same from rising when the ball-governor is in operation.

The balls 169 of the ball-governor are carried by bowed springs 170, the lower ends of which are secured to a collar 171, fixed to the upper face of the miter-gear 163. The upper ends of these springs 170 are secured to a vertically-movable head 172, having a depending bearing-sleeve 173, turning on the upper end of the fixed shaft 166. The bowed springs 170 are under tension even when the device is not in operation, and to prevent them from straightening out, and thus moving the balls inward beyond their starting positions, I employ a horizontally-arranged stop-disk 174, having a hub 175 secured to the fixed shaft 166 in such position that the inner faces of the balls 169 will engage with its edge. To prevent the balls from being moved too far outward under the action of centrifugal force, I provide them with staple-like links 176, the inner bowed ends of which embrace the hub 175; but other devices than those just described might be employed for limiting the inward and outward movement of the balls.

The button 157, Fig. 50, is secured to the lower end of the rod 158 by means of a pin 157$^a$ and has its opposite faces flattened, as at 157$^b$, to adapt it to be entered into the opening 177 of the forked arm 178 of a safety-lever 179, the outer end of which is secured by a pivot 179$^a$ to the upper end of the bracket 126. The rod 158 is thus held against rotation by the forked arm 178 of the safety-lever, the safety function of which will be described later.

In order to have the rod 158 moved up and down in consonance with the variations in the speed of the prime motor and in order to provide for the constant vibration of the rod to prevent the starting-valve 55 from sticking and fouling, it is furnished at its upper end with a coupling-disk 180, Figs. 42, 43, and 46, secured to it by a pin 181. When the device is not running, the disk 180 rests upon a bearing-face 182, formed by the upper end of the head 172. When, however, the device is in operation, a vibrating-space 183, Fig. 43, will be formed between the disk 180 and the face 182. The disk 180 is formed upon its upper face with a transversely-arranged locking-rib 184, Fig. 47, entering a locking-groove 185, formed in the lower face of a vibrating head 186, corresponding in diameter to the disk 180 and located within a cap 187, having its lower end threaded for being screwed upon the threaded shoulder 172$^a$, Fig. 42, of the head 172. The lower face of the vibrating head 186 is formed with a socket 188, Fig. 45, for the reception of the extreme upper end of the vibrating rod 158, whereby the head 186 is kept centered. This head is formed, as shown in Figs. 42 and 43, with a deep circumferential groove 189 for reducing the area of its frictional engagement with the inner walls of the cap 187. The upper surface of the head 186 is formed with two pockets 190 for the reception of vibrating balls 191 191, which project slightly above its upper surface, and therefore into position to be engaged by two corresponding vibrating balls 192 192, located in sockets 193 193, formed in the lower face of an adjustable plug 194, screwed into the top of the cap 187 and carrying a jam-nut 195. This plug, with its balls 192 192, partakes of the rotation of the cap 187 with the head 172, whereby its said balls 192 192 are, so to speak, "bumped" once for each complete revolution of the head against and over each of the balls 191 and 191, located in the upper face of the vibrating head 186, coupled, as described, to the disk 180, secured to the rod 158, to which the shock of the "rough riding" of the balls 192 192 over the balls 191 191 is thus constantly communicated. The upper face of the head 186 is also formed with an annular raceway 196, receiving a series of balls 197, also entering an annular raceway 198, formed in the lower face of a ball-bearing ring 199, located near the top of the cap 187, and having the lower end of the plug 194 extended down through it.

It has already been explained that when the device is not running the lower face of the coupling-disk 180 rests upon the bearing-face 182 of the revolving and vertically-movable head 172. As soon, however, as the ball-governor is started and the balls 169 thereof are thrown out by the action of centrifugal force the head 172 and all of the parts connected therewith will be drawn downward until the lower end of the vibrating rod 158 strikes the upper face of the coupling-head 156. This will stop the further downward movement of the rod 158, except such movement as it may be compelled to make against the tension of the torsion-spring 152; but normally the downward movement of the rod 158 will be stopped by the button 156, when the continued downward movement of the head 172 will result in the production of the vibrating-space 183, Fig. 43, which is ample for the slight vibration of the disk 180 and head 186 in the cap 187 produced by the riding of the balls 192 192 over the balls 191 191. At the same time that the space 183 is produced the space 183$^a$, Fig. 42, between the upper face of the head 186 and the ball-bearing ring 199, is contracted, as in Fig. 43, so as to bring the balls 197 into play for reducing friction.

When the prime motor is running on an even supply of power and on an even load, my speed-regulator will run without fluctuation and the vibrating rod 158 would not be disturbed unless means were provided for vibrating it, as above set forth. This vibration of the rod is communicated to the starting-valve 55 and prevents the same from sticking as it might do if the prime motor ran any considerable length of time without fluctuation in speed.

In order to provide for stopping the prime motor in case the transmission of the power thereof to the regulator should be interrupted—as, for instance, by the breaking of the belt driving the pulley 149—I provide the regulator with a safety device having the general functions and character of that described in United States Patent No. 522,920, granted to Marcus P. Schenck on July 10, 1894. This device comprises the lever 179, before referred to, having the forked arm 178 and also having a safety-arm 200, Fig. 25, carrying an adjusting-screw 201, extending upward so as to engage with the lower face of the shank of the speeder-lever fork 178. In case the belt over the pulley 159 should break, the bowed springs 170 would immediately act to lift the rod 158 and through the collar 157 lift the lever 179, causing the screw 201 thereof to lift the outer end of the speeder-lever 144, whereby the starting-valve 55 would be moved downward into position for starting the regulating-motor, which would thus operate to close the supply of power to the prime motor.

In order to adapt my improved speed-regulator to properly coact with the power-supply mechanism (valve or gate) of the particular prime motor with which the device is to be used, I provide means, Figs. 27 to 35, inclusive, for setting the device with respect to the open and closed positions of such mechanism and also with respect to the factor of friction-load. With this end in view the shaft 31 of the piston 36 is projected forward through the hub 32 in the cover 26 for the attachment to it of a stop-lever 202, which coacts with two adjustable stops 203 and 204, respectively, located in right position, so as to arrest the movement of the said lever just in time to stop the regulating-motor when the power-supply mechanism of the prime motor is full open and full closed. These stops are applied to an annular rib 205, cast integral with the outer face of the cover 26 and arranged concentric with the hub 32 thereof. The inner faces of the stops are formed with wide transverse grooves 206 to adapt them to fit over the rib 205, the inner face of which is formed with a groove 207 for the reception of a retaining-rib 208, projecting from the inner wall of the groove 206 of each stop. The outer portion of this groove 206 receives a gib 209, the tongue of which enters a circumferential groove 210, formed in the outer periphery of the rib 205. A set-screw 211, mounted in the outer end of each stop, engages with the gib thereof and crowds the same inward against the outer periphery of the rib, so as to bind the stop in any desired position thereupon. The stops are set so as to be engaged by the stop-lever when the regulating-motor has moved the steam-valve or water-gate, as the case may be, into its full open or full closed position, respectively. In order, moreover, to prevent any sudden removal of load from causing the speed-regulator to act to entirely cut off the supply of motive power (whether it be water or gas or steam) to the prime motor, I employ an anti-cut-off stop 212, formed with a notch 213 for the reception of the edge of the stop-lever 202. This stop is mounted for rotary and longitudinal movement in the inner portion of a sleeve 214, projecting outwardly at a right angle from the upper end of a segmental arm 215, having a slot 216 and fitting, as shown, in a recess 217, formed in the outer face of the stop 203, to which it is secured by a screw 218, bearing upon a washer 219, resting upon the outer face of the arm 215. By loosening the screw 218 the sleeve 214, and hence the stop 212, may be adjusted in position, as required, within the limits of the length of the slot 216. The said anti-cut-off stop 212 is located at the inner end of a spindle 220, extending outwardly through the sleeve 214 and encircled by a spiral spring 221, exerting a constant effort to push the stop 212 and spindle 220 inward. At its outer end the spindle is furnished with an operating-button 222, formed with two oppositely-located corresponding ribs 223, adapted to enter a pair of deep slots 224 224 in the outer end of the sleeve 214 to permit the stop 212 to move inward into position to be engaged by the stop-lever 202, and also adapted to enter a pair of shallow slots 225 225, formed in the outer end of the said sleeve at a right angle to the slots 224 224 therein. These four slots virtually divide the outer end of the sleeve into four segments 226, 227, 228, and 229. Of these four segments the diagonally-opposite segments 226 and 228 are made longer than the segments 227 and 229, so as to be engaged by the inner ends of the ribs 223 and 223 and act as stops to limit the rotation of the spindle to a quarter-turn, whereby the spindle is stopped with the ribs in position to enter either the deep slots or the shallow slots, as the case may be.

When the prime motor is running, the cut-off stop 212 will be set to be engaged by the stop-lever 202, so that in case of the sudden removal from the prime motor of the entire load or a part of the load the speed-regulator will be prevented from entirely cutting off the motive power from the prime motor by acting to entirely close the steam-supply valves or the water-gate, as the case may be. With this end in view the stop 212 will be adjusted with relation to the complete cut-off stop 203, so that enough steam or enough water will be supplied to the prime motor to carry what is known as the "friction-load" thereof. The stop 212 is therefore in reality an anti-cut-off stop. In the absence of such an anti-cut-off stop or some equivalent therefor a sudden removal of the entire load or a large part thereof might cause the regulator to act to entirely cut off the motive power from the prime motor which would then, however, run for a brief period of its own momentum. During this time the ball-regulator would operate the starting-valve 55 in starting the regulating-motor in reopening the steam-valves or water-gate to such an extent that the prime motor would be accelerated in speed with so large a supply of motive power with reference to the load that racing or hunting would result, for it will be understood that the non-racing device already described is not designed for or adequate to taking care of wide variations in the load. I may here explain that by locating a stop corresponding to the stop 212 on the other side of the stop-lever 202 I may provide for limiting the opening movement of the valve or gate supplying steam or water to the prime motor.

In order to limit the swinging movement in either direction of the starting-lever 23, and hence limit the oscillating movement in either direction of the main valve 81, I employ two adjustable stops 230, Fig. 3, counterparts of each other and mounted to face each other in the lower end of the cover 26, so as to be engaged by the faces 231 231, Figs. 17, 18, and 19, of the lower end of the said lever. The said stops 230 consist of hollow screws threaded into horizontal openings 230$^a$, formed in the cover 26 and furnished with jam-nuts 232. In order to cushion the stopping of the lever, I locate in each stop a buffer-pin 233, backed by a spring 234, held in place and regulated in tension by a screw 235, entered into the outer end of the hollow screw-stop. By turning the stops 230 in or out and by changing the tension of the springs 234 the oscillation of the main valve 81 may be adjusted to a nicety, so as to supply just the amount of oil required.

In order to prevent the speeder-lever 144 from "flapping," as it were, during the normal operation of the device, at which time there will always be sufficient fluctuations of speed to produce a slight movement of the speeder-lever, I provide two antiflapping-pins 236 236, Fig. 25, respectively located above and below the speeder-lever and almost but not quite in contact therewith. These pins are, in effect, yielding plungers and are mounted, in sleeves 237 237, located at the upper and lower ends of a bracket 238, cast upon the rear face of the bracket-arm 126. The springs controlling these pins are regulated in tension by set-screws 239 239. When the speeder-lever moves up or down ever so slightly, it engages with either one of the pins 236 236, which thus gently resist its movement and prevent it from flapping, as more fully described in my prior patent, granted August 5, 1902, No. 706,301.

Although the operation of the different features of my improved speed-regulator has been described in connection with the foregoing detailed description of their construction, it may be well to briefly outline the operation of the device as a whole. For this purpose it may be assumed that the device is connected with the gate of a water-wheel, which in this case would be the prime motor. Now supposing it is desired that the water-wheel shall maintain a normal speed of two hundred revolutions per minute, the finger-button 155, Fig. 1, will be turned in one way or the other, so as to produce in the torsion-spring 152 enough power to oppose the action of the ball-governor up to the point of two hundred revolutions in the water-wheel. When, therefore, the water-wheel exceeds that speed, the ball-governor will overcome the torsion of the spring 152 and operate the starting-valve 55. Let it be also assumed that there is pressure in the tank 77 of the regulator and that it is desired to start up the water-wheel. To do this, the operator opens the valve 79, Fig. 1, which allows the oil to flow from the pressure-tank 77 throughout what may be called "circulatory" system of the device. He then manually depresses the speeder-lever 144 against the tension of the ball-governor springs 170, whereby the starting-valve 55 is lifted. This permits oil under pressure to enter the piston-chamber 35, in which it acts upon the oscillating piston 36 and turns the main gear-wheel 29 from left to right. This gear-wheel is in mesh with the pinion 19, which is at this time locked against rotation by the gear-wheel 18 of the regulating-motor. The oil thus used is exhausted through the passage 46$^a$, thence through the passage 47$^a$, thence through the lower end of the valve 55 into the passage 69, thence into the exhaust-space 70 into the exhaust-pipe 72, and thence into the exhaust-tank 73. The gear-wheel 18 being held against rotation acts as a point of purchase through which the main wheel 29 acts to swing the lower end of the starting-lever 23 from left to right, whereby the main valve 81 is turned from right to left, and whereby the oil is admitted into and exhausted from the regulating-motor, which is immediately started up. The regulating-motor at once operates to open the water-wheel gate, whereby the water-wheel is started, and hence the ball-governor, which is connected with the water-wheel through the pulley 49. The ball-governor now acts in the usual way to regulate the running of the water-wheel, which operates without interference on the part of the speed-regulator unless it speeds up and exceeds two hundred revolutions per minute. If this should occur, the ball-governor would at once operate to automatically depress the starting-valve 55, which, it will be remembered, was manually depressed against the tension of the ball-governor spring 170 in starting the water-wheel. The depression of the starting-valve 55 permits the admission of oil under pressure into the piston-chamber 35 through the passage 46$^a$, causing the oscillating piston 36 to be moved from right to left, during which time the oil will be exhausted into the exhaust-tank 73 through the port 46, the passage 47, the upper end of the valve 55, and thence through the passages provided into the pipe 72, and thence to the exhaust-tank 73. The movement of the oscillating piston, as described, will turn the main wheel 29 from right to left and that in turn will throw the lower end of the starting-lever 23 from right to left and turn the main valve 81 from left to right, whereby oil will be admitted into and exhausted from the regulating-motor, which will at once start to close the water-wheel gate, whereby the water-wheel will be restored to its normal speed. The oil exhausted from the regulating-motor enters the exhaust-space 70 and passes thence into the space 71 and from that into the pipe 72, which leads it to the exhaust-tank 73. On the other hand, if the speed of the water-wheel should fall below two hundred revolutions per minute, the torsion-spring 152, through the fork 148 and coupling-head 156, will lift the starting-valve 55 and permit oil under pressure to enter the chamber 35, through the port 46, whereby the oscillating piston 36 will be moved from left to right and start the wheel 29, which will shift the starting-lever 23 from left to right and turn the main valve 81 from left to right, which will start the regulating-motor, which will still further open the water-wheel gate and admit more water to the wheel until the same is speeded up to its normal speed.

My improved speed-regulator is on account of its peculiar construction extremely sensitive to the slightest change of load on the prime motor, so that as the prime motor is effected by change of load the speed-regulator at once responds to this influence and effects the proportionate opening of the water-gate if the load is increased or the proportionate closing of the water-gate if the load is decreased. In view of this extreme sensitiveness of the device and to take care of the momentum of the prime motor the non-racing device described is provided to prevent the water-gate from being opened too far or closed too far, as the case may be.

I may now call attention to the fact that as soon as the oscillating piston 34 starts to move in either direction its movement is communicated to the non-racing device, the friction-wheel 109 of which is started in rotation simultaneously with admission of oil under pressure into the pressure-chamber 106 of the non-racing device through the channels described by the turning of the main valve 81 in either direction, whereby the oscillating friction-disk 108 is frictionally coupled with the rotating friction-disk 109 practically as soon as the regulator is started. The friction-disk 108 then acts through the non-racing rod 124 to bring the yielding pin 134 or the yielding pin 142 into engagement with the speeder-lever 144, so as to yieldingly oppose the movement thereof in the direction in which it has been started by the ball-governor. Thus if the load has been increased and the ball-governor is starting to depress the outer end of the speeder-lever 144 the non-racing pin 134 will yieldingly oppose such depression and in that way prevent the starting-valve 55 from being lifted to excess. On the other hand, if the load has been decreased and the ball-governor is starting to lift the outer end of the speeder-lever the same will be brought into engagement with the upper non-racing pin 142, which will yieldingly oppose too great a depression of the starting-valve 55, with the result of preventing too great an opening of the water-gate. It will thus be seen that the non-racing device, which is started simultaneously with the regulating-motor, yieldingly opposes too great an action thereof for opening or closing the gate, as the case may be.

The yielding antiflapping-pins 236 are always ready to steady the speeder-lever and prevent it from flapping, as already described.

It should, perhaps, be explained that while the main wheel 29, acting through the starting-lever 23 and the main valve 81, is utilized to start the regulating-motor as soon as the same is started it begins to act through the pinion 7, the gear-wheel 16, the shaft 17, the gear-wheel 18, pinion 19, and wheel 29 to exert an effort to swing the starting-lever 23 so as to close the main valve 81; but this effort is ineffectual as long as the wheel is being moved by the oscillating piston either one way or the other and only becomes effective when the wheel 29 stops, at which time it becomes a point of purchase for the regulating-motor to utilize in swinging the starting-lever 23 so as to operate the main valve 81 to cut off the oil from the regulating-motor. It will be further understood that as a theoretical proposition when the prime motor is running at its predetermined speed the speed-regulator will be at rest, with all of its valves closed with the exception of its ball-governor, which, though always running, operates to lift or depress the starting-valve 55 only when the speed of the prime motor exceeds or falls below its predetermined normal rate. As a matter of practice, however, my improved speed-regulator is so sensitive that it will constantly be brought into play for correcting the action of the prime motor due to its exceeding or falling below its normal rate on account of variations in load.

It should also be explained that the operator stops and starts the prime motor through the medium of the speed-regulator. To stop the prime motor, the operator seizes the button 222 and pulls it outward against the tension of the spring 221, so as to clear the anti-cut-off stop 212 from the path of the stop-lever 202. Here it may be stated that after the prime motor had been started the anti-cut-off stop 212 was brought into place for coacting with the stop-lever to prevent the water-gate from being entirely closed. Now when it is desired, as assumed, to stop the prime motor the anti-cut-off stop 212 is moved out of the way of the stop-lever 202. Then the operator manually lifts the speeder-lever against the torsion of the spring 152, whereby the starting-valve 55 is depressed, with the result of causing the regulating-motor to be started in closing the water-gate, which it will now do entirely, because the stop 212 is out of the way and the stop-lever is allowed to move until it is brought against the complete cut-off stop 203, which represents the limit of movement necessary to entirely close the water-gate. When that takes place, the prime motor will of course stop.

Now that we are speaking of the stop-lever 202 it may be well to add that the stop 204 will be set so as to limit the opening movement of the gate to an extent which the gate may be safely opened, for it is conceivable that the gate might be opened so far that it would strain the connections between the gate and the operating mechanism thereof.

It is to be further understood that although the speed-regulator is as an organization at rest when the prime motor is running at its normal speed the vibrating feature is constantly operated, so as to prevent the starting-rod and the starting-valve 55 from sticking, which insures the responsive action of the valve in case the normal speed is departed from.

It is apparent that in carrying out my invention some changes from the construction herein shown and described may be made. I would therefore have it understood that I do not limit myself thereto, but hold myself at liberty to make such departures therefrom as fairly fall within the spirit and scope of my invention.

Having fully described my invention, what I claim as new, and desire to secure by Letters Patent, is—

1. In a speed-regulator, the combination with a centrifugal governor, of a starting-valve controlled thereby, an oscillating piston controlled by the said starting-valve, an oscillating main valve, gearing between the said oscillating piston and oscillating main valve, whereby the latter is operated, and a motor controlled by the said main valve, the said starting-valve, oscillating piston, oscillating main valve and motor being connected by suitable inlet and exhaust passages for the circulation of the operating fluid.

2. In a speed-regulator, the combination with a centrifugal governor, of a starting-valve controlled thereby, an oscillating piston controlled by the starting-valve, an oscillating main valve, a motor controlled by the said oscillating main valve, and connections between the said oscillating piston and oscillating main valve, including an oscillating starting-lever.

3. In a speed-regulator, the combination with a centrifugal governor, of a starting-valve controlled thereby, an oscillating piston controlled by the starting-valve, an oscillating main valve, and connections between the said piston and main valve including gearing whereby the movement of the piston is multiplied in the main valve.

4. In a speed-regulator, the combination with a centrifugal governor, of a starting-valve controlled thereby, an oscillating piston controlled by the starting-valve, an oscillating main valve, a main wheel connected with the piston, an oscillating starting-lever, a pinion carried thereby and meshing into the main wheel, a segment connected with the main valve, and a rack carried by the said lever and meshing into the said segment.

5. In a speed-regulator, the combination with a centrifugal governor, of a starting-valve, an oscillating piston controlled by the starting-valve, an oscillating main valve operated by the said piston, a non-racing device, and means connecting the non-racing device with the oscillating piston.

6. In a speed-regulator, the combination with a centrifugal governor, of a starting-valve, an oscillating piston controlled thereby, an oscillating main valve operated by the said piston, a non-racing device having a driving-pinion, and a wheel connected with the oscillating piston and meshing into a pinion of the non-racing device which is started when the piston is started.

7. In a speed-regulator, the combination with a centrifugal governor, of a starting-valve, an oscillating piston controlled thereby, an oscillating main valve operated by the said oscillating piston, a non-racing device having mechanically-operated and fluid-operated members, and connection between the said oscillating piston and the mechanically-operated member of the non-racing device, the fluid-operated member whereof is controlled by the said main valve.

8. In a non-racing device for speed-regulators, the combination with a revolving friction-disk, of means for starting the same revolving in either direction when the regulator is started, an oscillating friction-disk coacting with the revolving friction-disk, means for transmitting the movement of the oscillating disk to other parts of the regulator for controlling the same, and oil-passages leading to and from the said oscillating disk, whereby oil under pressure is brought to bear on the same for moving the same into engagement with the revolving disk.

9. In a non-racing device for speed-regulators, the combination with a mechanically-operated friction-disk started in revolution in one direction or the other when the regulator starts, of an oscillating fluid-controlled friction-disk movable toward and away from the mechanically-operated revolving disk, inlet and exhaust passages for fluid under pressure leading to and from the oscillating disk, and means located in the said exhaust-passage for controlling the time of exhaust, and hence determining the separation of the disks.

10. In a speed-regulator, the combination with a centrifugal governor, of a starting-valve, a speeder-lever connected with the said governor and starting-valve, a non-racing device, and connections between the said non-racing device and speeder-lever, including yielding buffer-pins respectively arranged to engage with the upper and lower faces of the said speeder-lever and equalizing-springs for restoring the said pins to their normal positions when the speeder-lever has been restored to its normal position.

11. In a speed-regulator, the combination with a centrifugal governor, of a starting-valve, a speeder-lever connected with the said governor and starting-valve, a non-racing device having a mechanically-operated revolving friction-disk, and an oscillating friction-disk moved by oil under pressure into contact with the said revolving disk, an operating-rod connected with the said oscillating disk, buffer-heads mounted upon the said rod at points above and below the speeder-lever, yielding buffer-pins mounted in the said buffer-heads for engagement with the upper and lower faces of the lever, and equalizing-springs combined with the said heads for restoring the buffer-pins to their normal positions with respect to the speeder-lever after the normal speed has been restored.

12. In a speed-regulator, the combination with a centrifugal governor, of a starting-valve, and an oscillating main valve controlled by the starting-valve formed with longitudinally-arranged inlet-ports and with radially-arranged outlet-ports located at its inner end and arranged quartering with respect to the said inlet-ports and the said valve being also formed with equalizing-passages extending to its periphery and forward through its forward face and opening rearwardly into the said outlet-ports.

13. In a speed-regulator, the combination with a centrifugal governor, of a starting-valve, a non-racing device and an oscillating main valve controlled by the said starting-valve and formed with radially-arranged exhaust-ports, longitudinally-arranged inlet-ports, and with a non-racing port leading out of one of its inlet-ports and supplying oil to the oil-controlled member of the said non-racing device.

14. In a speed-regulator, the combination with a centrifugal governor, of a starting-valve, an oscillating main valve operated by the said starting-valve and having longitudinally-arranged inlet-ports and radially-arranged exhaust-ports, and a valve-sleeve receiving the said main valve and formed with two pairs of inlet-ports and two pairs of exhaust-ports to register with the inlet and exhaust ports of the valve, and the inlet-ports of the casing being connected together by channels formed in the inner periphery thereof.

15. In a speed-regulator, the combination with a centrifugal governor, of a starting-valve, a non-racing device, an oscillating main valve operated by the starting-valve and formed with inlet and exhaust ports and with a non-racing port leading out of the inner end of one of its inlet-ports, and a sleeve-like valve-casing formed with ports for coaction with the non-racing inlet-port in the valve.

16. In a speed-regulator, the combination with an upright frame formed with a horizontally-arranged chamber for the main valve, a vertically-arranged annular chamber located above the same for the reception of an oscillating piston, and an upright chamber located back of the said annular chamber for the reception of the starting-valve; of an oscillating main valve, a reciprocating starting-valve and an oscillating piston located in the said chambers as described.

17. In a speed-regulator, the combination with a chambered upright frame comprising a base-section formed with a horizontally-arranged chamber for the reception of the main valve, an upper section formed with a vertically-arranged annular chamber for the reception of an oscillating piston, and an intermediate section formed with a vertically-arranged chamber for the reception of a reciprocating starting-valve; of an oscillating main valve, an oscillating piston, and a reciprocating starting-valve.

18. In a speed-regulator, the combination with an upright frame having its base formed with a horizontally-arranged main-valve chamber and with two inlet-pipes and two outlet-pipes made integral with the said frame and leading into and out of the said chamber, the said frame being also formed with a starting-valve chamber and a piston-chamber; of an oscillating main valve located in the said main-valve chamber in the base of the frame, a reciprocating starting-valve located in the said starting-valve chamber, and an oscillating piston located in the said piston-chamber.

19. In a speed-regulator, the combination with an upright chambered frame having an annular piston-chamber, of a cover for the said frame, a centrifugal governor, a starting-valve, a piston oscillating in the said chamber and having its outer trunnion furnished with a short shaft extending through the cover, a stop-lever applied to the said projecting end of the shaft, adjustable stops located upon the outer face of the cover for coaction with the said lever, and an adjustable anti-cut-off stop also coacting with the said lever.

20. In a speed-regulator, the combination with a chambered upright frame, of a cover therefor, a centrifugal governor, a starting-valve, an oscillating piston controlled thereby, an oscillating main valve the inner trunnion of which has bearing in the said frame and the outer trunnion of which has bearing in the said cover, a main wheel connected with the oscillating piston, a gear-segment carried by the main valve, an oscillating starting-lever one trunnion of which is journaled in the frame and the other in the said cover, a pinion carried by the said lever and meshing into the said wheel, a rack carried by the lever and meshing into the said gear-segment, and a gear-wheel meshed into by the said pinion and connected with a regulating-motor.

21. In a speed-regulator, the combination with a chambered upright frame, of a cover therefor, a centrifugal governor, a starting-valve, an oscillating piston controlled by the starting-valve, an oscillating main valve, a main wheel connected with the oscillating piston, an oscillating starting-lever, a pinion located in the upper end of the said lever and meshing into the said wheel, a rack carried by the lower end of the said lever, a segment carried by the main valve and meshed into by the said rack, and buffers located opposite each other in the lower end of the said cover and engaged by the lower end of the said cover and engaged by the lower end of the said lever as it swings from side to side.

22. In a speed-regulator, the combination with a centrifugal governor, of a vertically-movable operating-rod connected at its upper end with the said governor and operated thereby, a vibrator located between the upper end of the governor and the upper end of the said rod, whereby the rod is constantly vibrated, and a starting-valve connected with the lower end of the said rod and having the vibrations thereof communicated thereto, whereby it is prevented from sticking.

In testimony whereof I have signed this specification in the presence of two subscribing witnesses.

JOSEPH E. JOHNSON.

Witnesses:
CLARA L. WEED,
GEORGE D. SEYMOUR.